(12) United States Patent
Narasimha et al.

(10) Patent No.: US 7,839,814 B2
(45) Date of Patent: Nov. 23, 2010

(54) METHOD AND SYSTEM FOR ADJUSTING INTER-SCAN PERIOD OF A MOBILE STATION

(75) Inventors: Murali Narasimha, Grayslake, IL (US); Naveen Aerrabotu, Gurnee, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1255 days.

(21) Appl. No.: 11/159,617

(22) Filed: Jun. 23, 2005

(65) Prior Publication Data

US 2007/0008941 A1    Jan. 11, 2007

(51) Int. Cl.
*H04B 7/00* (2006.01)
*H04W 4/00* (2009.01)

(52) U.S. Cl. .................................. 370/328; 370/338

(58) Field of Classification Search ............... 370/328, 370/329, 338, 331–334, 401; 455/403, 422.1, 455/434, 436, 440, 442, 456.1
See application file for complete search history.

(56) References Cited

U.S. PATENT DOCUMENTS

| 6,167,268 A | 12/2000 | Souissi et al. |
| 7,197,310 B2 * | 3/2007 | Gehlot et al. ............... 455/440 |
| 2004/0165563 A1 | 8/2004 | Hsu et al. |
| 2004/0198408 A1 | 10/2004 | Dillon et al. |
| 2006/0146754 A1 * | 7/2006 | Bejerano .................... 370/332 |

* cited by examiner

*Primary Examiner*—Chirag G Shah
*Assistant Examiner*—Srinivasa R Reddivalam
(74) *Attorney, Agent, or Firm*—Hisashi D. Watanabe (57) ABSTRACT

A method and system for adjusting the inter-scan period of a mobile station (102) is provided. The method includes storing (404) the location information of a first wireless node, which is in a service area of a wireless access point of a first wireless network that is servicing a second wireless network. Further, the method includes receiving (406) second location information pertaining to a second wireless node that is servicing the second wireless network. The method further includes determining (408) a distance between the first and second wireless nodes. Further, the method includes enabling (412) the scanning for the first wireless network, based on the distance between a cellular cell that includes the MS and a cellular cell that includes an access point of the first wireless network.

15 Claims, 10 Drawing Sheets

METHOD AND SYSTEM FOR ADJUSTING INTER-SCAN PERIOD OF A MOBILE STATION

FIELD OF THE INVENTION

The present invention relates generally to the field of wireless devices. In particular, the present invention relates to a method and system for adjusting the inter-scan period of a mobile station (MS).

BACKGROUND OF THE INVENTION

Mobile stations that support a cellular technology and a wireless network, such as wireless local area networks (WLANs) are being developed. The mobile stations are required to periodically scan for the wireless networks when they are not in the service areas covered by the wireless networks. Scanning for wireless networks is a resource-intensive operation, which results in the rapid draining of the battery in the mobile stations. Most of the scanning carried out by the mobile station takes place when it is not near a site, known as an access site, where a wireless network is accessible. Scanning for wireless networks when a mobile station is not near an access site is an unnecessary expenditure of resources, such as the battery in the mobile station. Unnecessary scanning can be avoided by determining the location of the mobile station with respect to wireless network access sites.

Known technologies used for determining location, such as the Global Positioning System (GPS) and the Enhanced-observed Time Difference (E-OTD), are not feasible solutions for determining the location of the mobile station. They are not viable because GPS requires scanning of its own as well as communication with a wireless network. Similarly, E-OTD requires a mobile station to acquire network information, location coordinates, and scheduled signal bursts from multiple transmitting stations. The energy expended by the mobile station to determine its location, using these conventional location determination technologies, can be utilized to scan a wireless network. The locations where WLANs are available are typically inside buildings, and GPS and E-OTD are unable to provide accurate information pertaining to such locations.

Accordingly, there is a need for a mechanism that enables a mobile station to change its method of scanning for WLANs, to conserve its resources. The mechanism of scanning for WLANs should enable a mobile station to change the frequency of scanning for WLANs. The mechanism should also allow scanning for WLANs frequently enough to allow a mobile station to locate a WLAN, without an unreasonable delay.

BRIEF DESCRIPTION OF THE DRAWINGS

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE PREFERRED EMBODIMENTS

Before describing in detail the particular method and system for adjusting the inter-scan period of a mobile station (MS) in accordance with the present invention, it should be observed that the present invention resides primarily in combinations of method steps and apparatus components related to adjusting the inter-scan period of a mobile station (MS). Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" or "comprising . . . a" does not, without more constraints, preclude the existence of additional identical elements in the process, method, article, or apparatus that comprises the element.

A "set" as used in this document, means a non-empty set (i.e., comprising at least one member). The term "another", as used herein, is defined as at least a second or more. The terms "including" and/or "having", as used herein, are defined as comprising.

The present invention may be applied to determine the distance between the cell of a cellular network, called a cellular cell, which includes an MS; and a cellular cell, which includes a wireless access point. For one embodiment, the distance is determined in terms of the distance between the wireless nodes of the cellular cell, which includes the MS and that of the cellular cell that contains the wireless access point. If the MS moves beyond a certain threshold distance from a wireless access point, scanning for the wireless network with the wireless access point is disabled. For one embodiment, the threshold distance is determined in terms of the distance between the wireless nodes of the cellular cells. When the MS approaches a cellular cell containing a wireless access point, the process of scanning for wireless networks is initiated.

The present invention may also be applied to adjust the periodicity of scanning by an MS for a wireless network. The periodicity of scanning may be changed so that the MS scans for wireless networks more frequently when it receives signals with a higher degree of similarity to those detectable at the access points of the wireless networks. The frequency of scanning for wireless networks is reduced when the MS receives signals with a lower degree of similarity to those detectable at the access points.

One aspect of the present invention is a method for enabling scanning for a first wireless network by an MS. Location information pertaining to a first wireless node is stored. A wireless access point of the first wireless network lies within the coverage area of a first wireless node of the second wireless network. Further, second location information related to a second wireless node that is servicing the second wireless network is received. Thereafter, the distance between the first and second wireless nodes is determined. Scanning for the first wireless network is enabled, based on the distance between a cellular cell comprising the MS and a cellular cell that includes a wireless access point of the first wireless network.

Another aspect of the invention is a method for adjusting the periodicity of scanning for a first wireless network by an MS. First identification information pertaining to wireless nodes that can be detected at a first location is stored. The first location is within the proximity of a wireless access point of a first wireless network, and services a second wireless network. Further, second identification information relating to wireless nodes that can be detected at a second location is received. The wireless nodes service the second wireless network. The first identification information and the second identification information are then compared and an inter-scan period for scanning the first wireless network is decided, based on the comparison.

Yet another aspect of the present invention is a MS that adjusts the periodicity of scanning for a first wireless network, based on information pertaining to a second wireless network with a plurality of wireless nodes. The MS includes a storage module, a receiver, a processor, and a scanner. The storage module is configured to store the first information relating to a first wireless node, the receiver to receive the second information pertaining to a second wireless node, and the processor to determine the distance between the first and second wireless nodes and select inter-scan periods. The processor is further configured to compare the first and second information. Furthermore, the processor is also configured to select an inter-scan period for scanning for the first wireless network. The scanner is configured to scan for the first wireless network.

Figure 1:
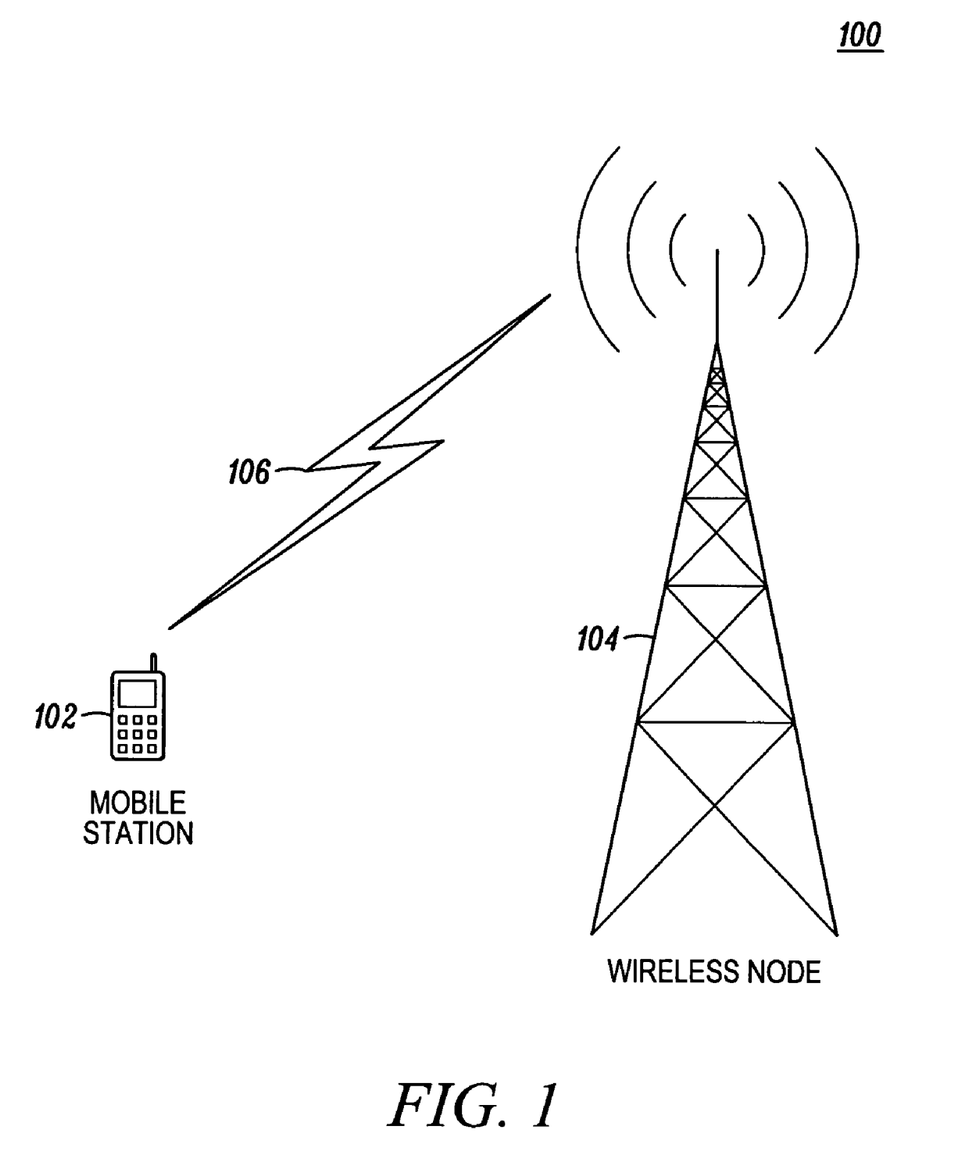
FIG. 1 is an exemplary environment illustrating the interaction between a mobile station and a wireless node, in accordance with an embodiment of the present invention.

Referring to FIG. 1, an exemplary environment illustrating the interaction between a mobile station and a wireless node is depicted, in accordance with the present invention. The mobile station 102 communicates with the wireless node 104 through transmission signals 106, which are transmitted and received between the mobile station 102 and the wireless node 104. The transmission signals 106 may include location information, identification information, voice calls and packet data being transmitted and received between the mobile station 102 and the wireless node 104.

Figure 2:
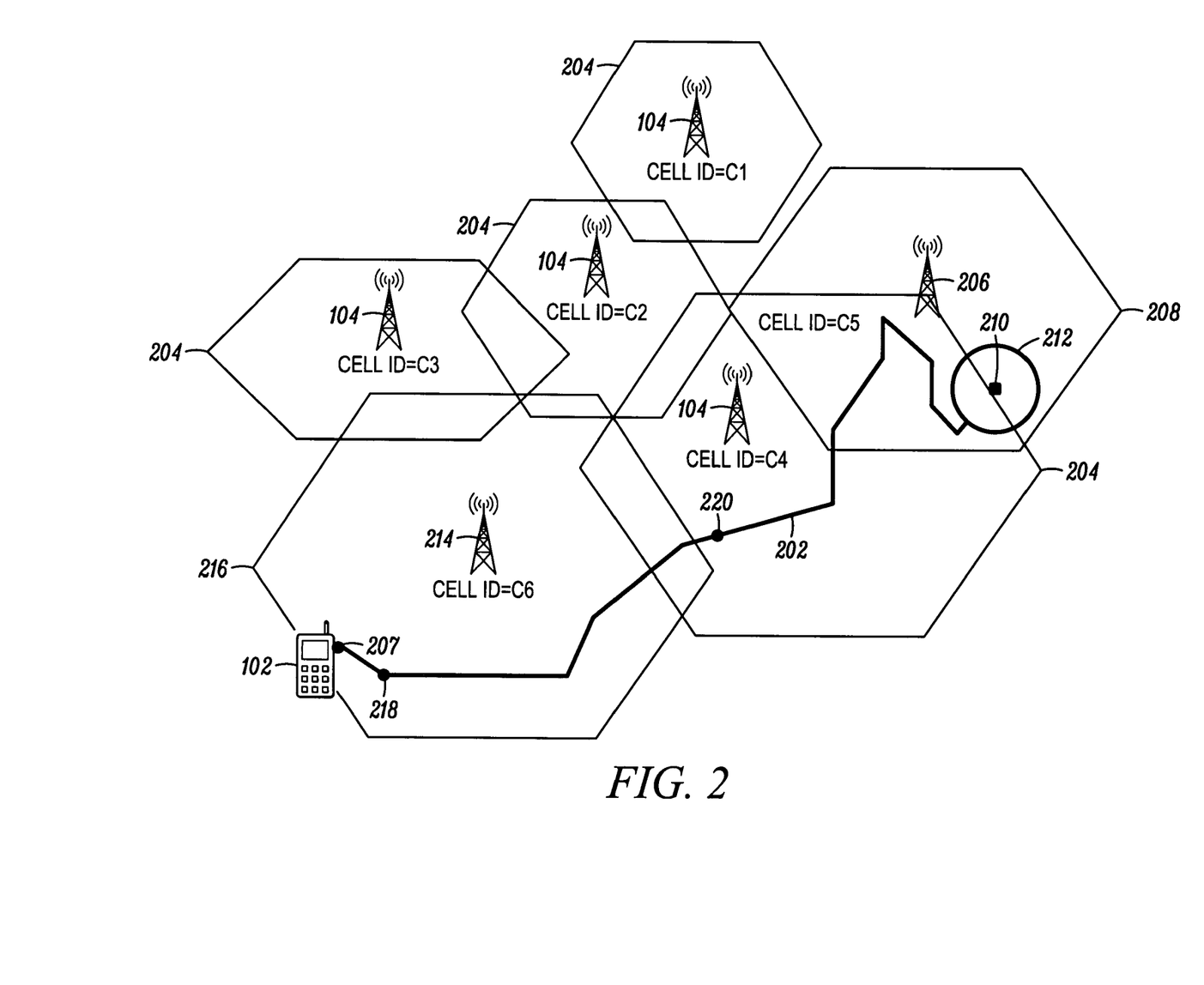
FIG. 2 is a block diagram illustrating scanning for wireless networks, based on the distance between a mobile station and a wireless network, in accordance with an embodiment of the present invention.

Referring to FIG. 2, a block diagram illustrates scanning location information of wireless networks, based on the distance of a mobile station from the wireless networks, in accordance with an embodiment of the present invention. For one embodiment, the wireless network is a code division multiple access (CDMA) network; for another, it is a global system for mobile communication (GSM) network. In FIG. 2, cellular cells are represented by hexagons that overlap each other, to provide uninterrupted coverage throughout the service area of the cellular network. The mobile station 102 takes a travel path 202 across multiple cellular cells, such as cellular cell 204, corresponding to multiple wireless nodes, such as wireless node 104. For one embodiment, the mobile station 102 takes the travel path 202 towards a first wireless node 206 starting from a current location 207, as shown in FIG. 2. The first wireless node 206 provides cellular service within a cellular cell 208. For one embodiment, a cellular cell with a wireless access point is referred to as the first wireless node 206. The wireless access point 210 provides service in a first wireless network 212. For one embodiment, the first wireless network is a wireless local area network (WLAN). By taking the travel path 202, the mobile station 102 is serviced by a second wireless node 214 when it is in a cellular cell 216 with cell ID C6. For one embodiment, a cellular cell with the mobile station 102 is referred to as the second wireless network with the second wireless node 214. Supposing that, at a position 218, the mobile station 102 lies at a distance from the wireless access point 210 that is greater than a threshold distance D. The distance between the mobile station 102 and the wireless access point 210 is determined in terms of the distance between the cellular cell 216 of the second wireless node 214 that currently includes the mobile station 102, and the cellular cell 208 of the first wireless node 206 that includes the wireless access point 210. Therefore, at the position 218, scanning for the first wireless network 212 is disabled. As the mobile station 102 moves towards the wireless access point 210 and enters cellular cell 204 with cell ID C4, the wireless node 104 servicing the cellular cell 204 becomes the second wireless node 214. For an embodiment, the second wireless node 214 and its cellular cell 216 is not fixed in nature, and depends solely on the location of the mobile station 102.

Supposing that, at position 220, the mobile station 102 lays at a distance that is less than the threshold distance D. For one embodiment, the distance is determined in terms of the distance between cellular cell 204 with cell ID C4 and the cellular cell 208. Therefore, at the position 220, scanning for the first wireless network 212 is enabled. For an embodiment, the period between two scans, the inter-scan period, for the first wireless network 212 is set at 8t, where 't' is the conventional inter-scan period. With this value of the inter-scan period, the mobile station 102 scans for the first wireless network 212 at one-eighth the frequency conventionally employed for scanning the first wireless network 212. It is to be understood that the present invention may utilize other fractions of the frequency that are conventionally employed for scanning the first wireless network 212. These fractions may be smaller or greater than the current one-eighth, changing the inter-scan period in direct proportion to their size.

The method of enabling and disabling scanning for the first wireless network 212, based on the determination of the distance between the first wireless node 206 and second wireless node 214, is further explained in conjunction with FIGS. 4, 6, 7, 8, and 9.

Figure 3:
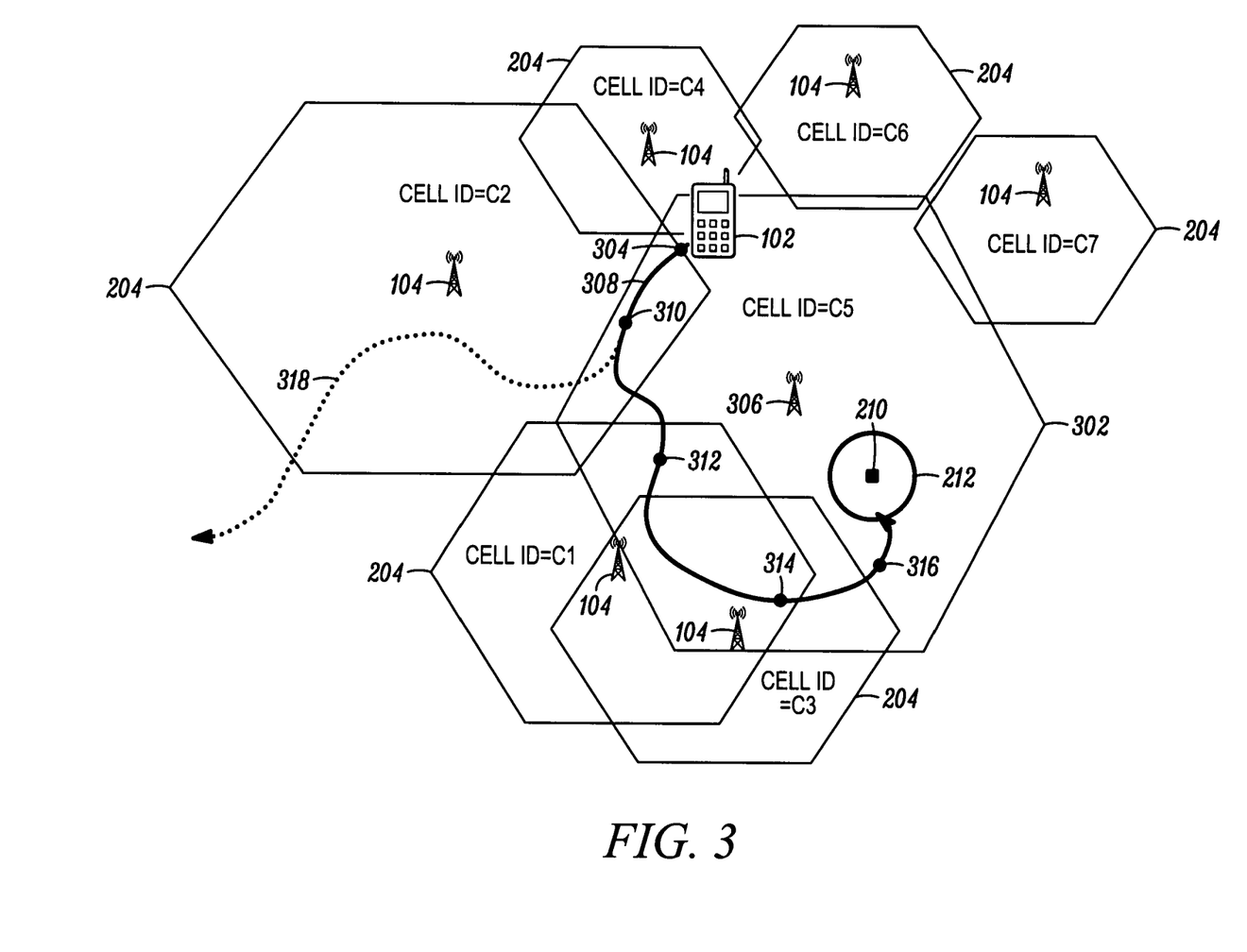
FIG. 3 is a block diagram illustrating adjustment of the periodicity of scanning for wireless networks, in accordance with an embodiment of the present invention.

Referring to FIG. 3, the concept of adjusting the periodicity of scanning for wireless networks is shown, in accordance with an embodiment of the present invention. The adjustment uses identification information pertaining to the cellular cells, whose signal can be detected by the mobile station 102 at a given location. The identification information may include the pilot information of the second wireless network. The pilot information includes a pseudo-random noise offset of the second wireless network, such as a CDMA cellular network. The pilot information is hereinafter referred to as pilot. The mobile station 102 stores a first identification information about the wireless access point 210 that is servicing the first wireless network 212. The first identification information includes a plurality of pilots that the mobile station 102 detects when it is in the first wireless network 212. For one embodiment, the mobile station 102 detects the pilots of not only cell 302 with cell ID C5 but also of one or more cells 204 whose signals may be detected at that location, when in the first wireless network 212. Supposing the mobile station 102 receives pilots of cellular cells with cell IDs C1, C3 and C5 in the first wireless network 212. This is represented as $P_{wacc-site}$ and is equal to (C1, C3, C5).

At a position 304, the mobile station 102 is in the cell 302 that includes the wireless access point 210, and is serviced by a wireless node 306. The mobile station 102 receives the second identification information that includes multiple pilots it detects at the position 304. For an embodiment, the second identification information includes the pilots of the cellular cells with cell IDs C2, C4 and C5. The pilots detected by the mobile station 102 at a given location are represented as $P_{current}$, and at the position 304, are equal to (C2, C4, C5). Therefore, at the position 304, the degree of overlap between the second identification information received by the mobile station 102 and the first identification information stored in the mobile station 102, represented by the relation $|P_{wacc-site} \cap P_{current}|$, is 1, since one pilot, the pilot of the cellular cell with cell ID C5, is common. For one embodiment, the degree of overlap is determined by counting the number of elements common to the first identification information and the second identification information. Based on the degree of overlap, the inter-scan period is changed and governed by the relation $2^{-|P_{wacc-site} \cap P_{current}|}$. Therefore, for $|P_{wacc-site} \cap P_{current}|=1$ $P_{current}|=1$, the inter-scan period is changed to $2^{-1}$ times, in other words, one-half the initial value when computed by using the relation $2^{-|P_{wacc-site} \cap P_{current}|}$. For one embodiment, the inter-scan period decreases with an increase in the degree of overlap, the inter-scan period, and the degree of overlap related by an inverse exponential relationship. For the current embodiment, the initial value of the inter-scan period was set to 8t. Therefore, after the application of the current adjustment at the position 304, the value of the inter-scan period changes to one-half of 8t, which is 4t.

When the mobile station 102 moves to a position 310 along the travel path 308, it receives a second identification information, which includes multiple pilots it detects at the position 310. For an embodiment, at the position 310, the second identification information includes the pilots of the cellular cells with cell IDs C2 and C5, and $P_{current}$ is (C2, C5). Therefore, at the position 310, the degree of overlap between the pilots received by the mobile station 102 and the first identification information stored in the mobile station 102, when computed by using the relation $|P_{wacc-site} \cap P_{current}|$, is 1. Hence, for $|P_{wacc-site} \cap P_{current}|=1$, the inter-scan period remains the same at one-half of the initial value. For the current embodiment, the initial value of the inter-scan period was set to be 8t. Therefore, after the application of the current adjustment, the value of the inter-scan period remains unchanged from its setting at the position 304, namely, 4t.

When the mobile station 102 moves to a position 312 along the travel path 308, it receives a second identification information that includes multiple pilots it detects at the position 312. For an embodiment, the second identification information includes pilots of the cellular cells with cell IDs C1 and C5, and $P_{current}$ is (C1, C5). Therefore, the degree of overlap between the second identification information received by the mobile station 102 and the first identification information stored in the mobile station 102, when computed by using the relation $|P_{wacc-site} \cap P_{current}|$, is 2. Therefore, for $|P_{wacc-site} \cap P_{current}|=2$, the inter-scan period is changed to one-fourth of the initial value. For the current embodiment, the initial value of the inter-scan period was set at 8t. Therefore, after the application of the current adjustment, the value of the inter-scan period becomes 2t.

When the mobile station moves to a position 314 along the travel path 308, it receives a second identification information that includes multiple pilots it detects at the position 314. For an embodiment, the second identification information includes pilots of the cellular cell with cell IDs C1, C3 and C5. Therefore, the degree of overlap between the second identification information received by the mobile station 102 and the first identification information stored in the mobile station 102, when computed by using the relation $|P_{wacc-site} \cap P_{current}|$, is 3. Hence, for $|P_{wacc-site} \cap P_{current}|=3$, the inter-scan period is changed to one-eight of its initial value. For the current embodiment, the initial value of the inter-scan period was set at 8t. Therefore, after the application of the current adjustment, the value of the inter-scan period becomes t. This is the highest frequency of scanning for the first wireless network 212, and corresponds to the conventionally utilized frequency of scanning.

When the mobile station moves to a position 316 along the travel path 308, it receives a second identification information that includes multiple pilots it detects at the position 316. For an embodiment, the second identification information includes pilots of the cellular cell with cell IDs C1, C3 and C5. Therefore, the degree of overlap between the second identification information received by the mobile station 102 and the first identification information stored in the mobile station 102, when computed by using the relation $|P_{wacc-site} \cap P_{current}|$, is 3. Hence, for $|P_{wacc-site} \cap P_{current}|=3$, the inter-scan period is changed to one-eight of its initial value. For the current embodiment, the initial value of the inter-scan period was set at 8t. Therefore, after the application of the current adjustment, the value of the inter-scan period remains unchanged from its setting at the position 314, namely, t.

The inter-scan period is changed so that more frequent scanning for the first wireless network 212 takes place when the mobile station 102 approaches the wireless access point 210, and less frequent scanning for the first wireless network 212 takes place when the mobile station 102 moves away from the wireless access point 210. The changing of the inter-scan period ensures quick detection of the first wireless network 212, while minimizing resources spent by the mobile station 102 on scanning when the mobile station 102 is not close to the wireless access point 210.

If, on the other hand, the mobile station 102 takes a travel path 318, which is different from the travel path 308, the mobile station 102 continues scanning for the wireless access site 210 until it is within the threshold distance D from the wireless access point 210. Scanning is performed by the mobile station 102 at the inter-scan period determined by the relation $2^{-|P_{wacc-site} \cap P_{current}|}$. Therefore, for one embodiment, scanning remains enabled with the inter-scan period 8t as long as the mobile station 102 remains within the threshold distance D, and is disabled when the mobile station 102 moves beyond the threshold distance D, thereby conserving the battery in the mobile station 102.

This method of adjusting the periodicity of scanning for the first wireless network 212 is based on a comparison of the first identification information with the second identification information, and is further explained in conjunction with FIGS. 5, 6, 7, 8, and 9.

Figure 4:
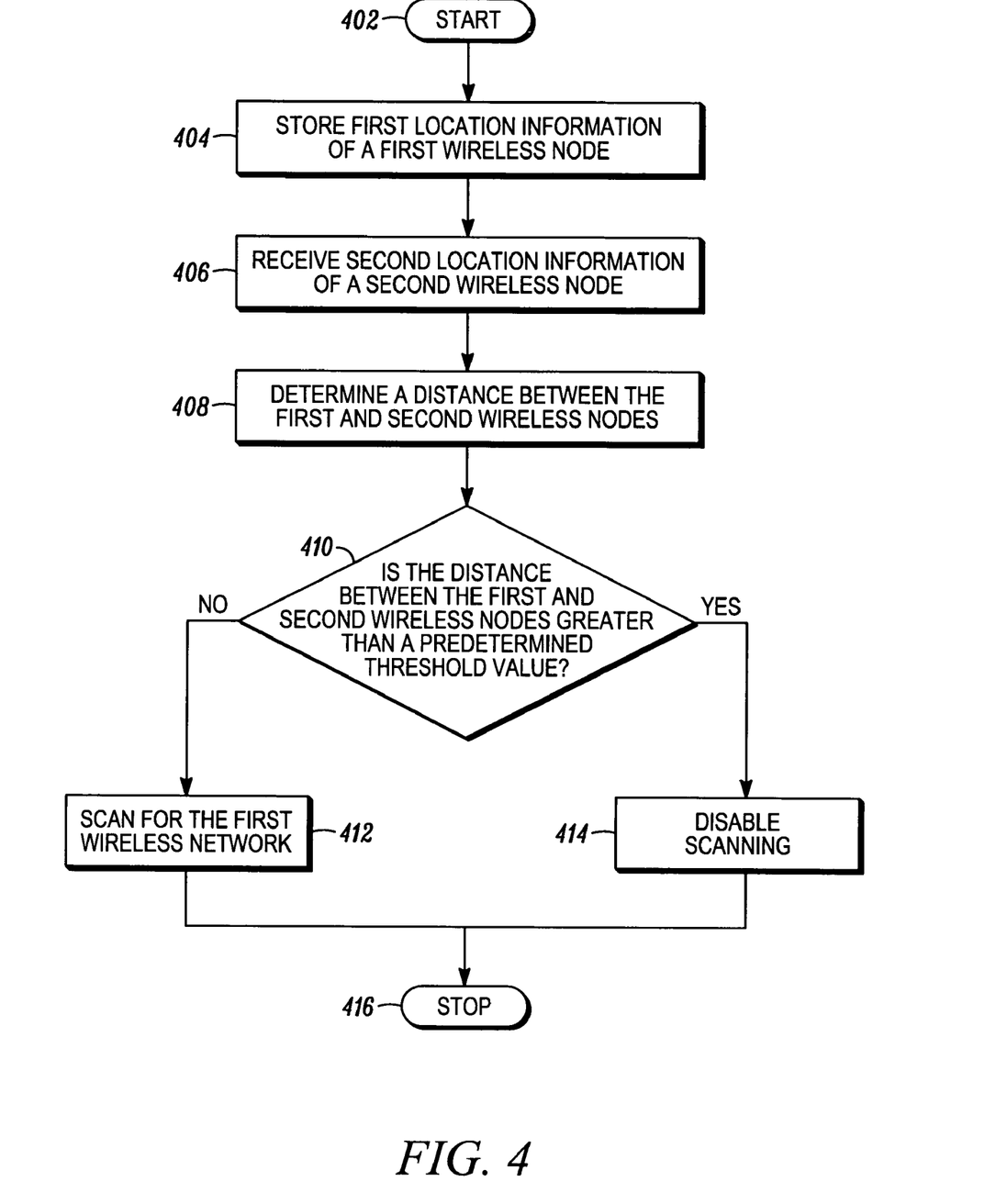
FIG. 4 is a flow diagram illustrating an exemplary method of enabling scanning for wireless networks, in accordance with an embodiment of the present invention.

Referring to FIG. 4, a flow diagram illustrating an exemplary method of enablement of scanning for wireless networks is shown, in accordance with an embodiment of the present invention. After initiating the process at step 402, the mobile station 102 stores the first location information of the first wireless node 206 at step 404. For one embodiment, the mobile station 102 records the serving frequency for at least one wireless access point, such as the wireless access point 210, serving the first wireless network At step 406, the mobile station 102 receives the second location information of the second wireless node 214 from the pilot transmitted by the second wireless node 214. At step 408, the distance between the first wireless node 206 and the second wireless node 214 is determined. At step 410, the distance between the first wireless node 206 and the second wireless node 214 is compared with the threshold value. If the distance between the first wireless node 206 and the second wireless node 214 is not greater than the threshold value, scanning for the first wireless network is enabled at step 412. If the distance between the first wireless node 206 and the second wireless node 214 is greater than the threshold value, at step 410, scanning for the first wireless network is disabled at step 414. Thereafter, the process terminates at step 416.

Figure 5:
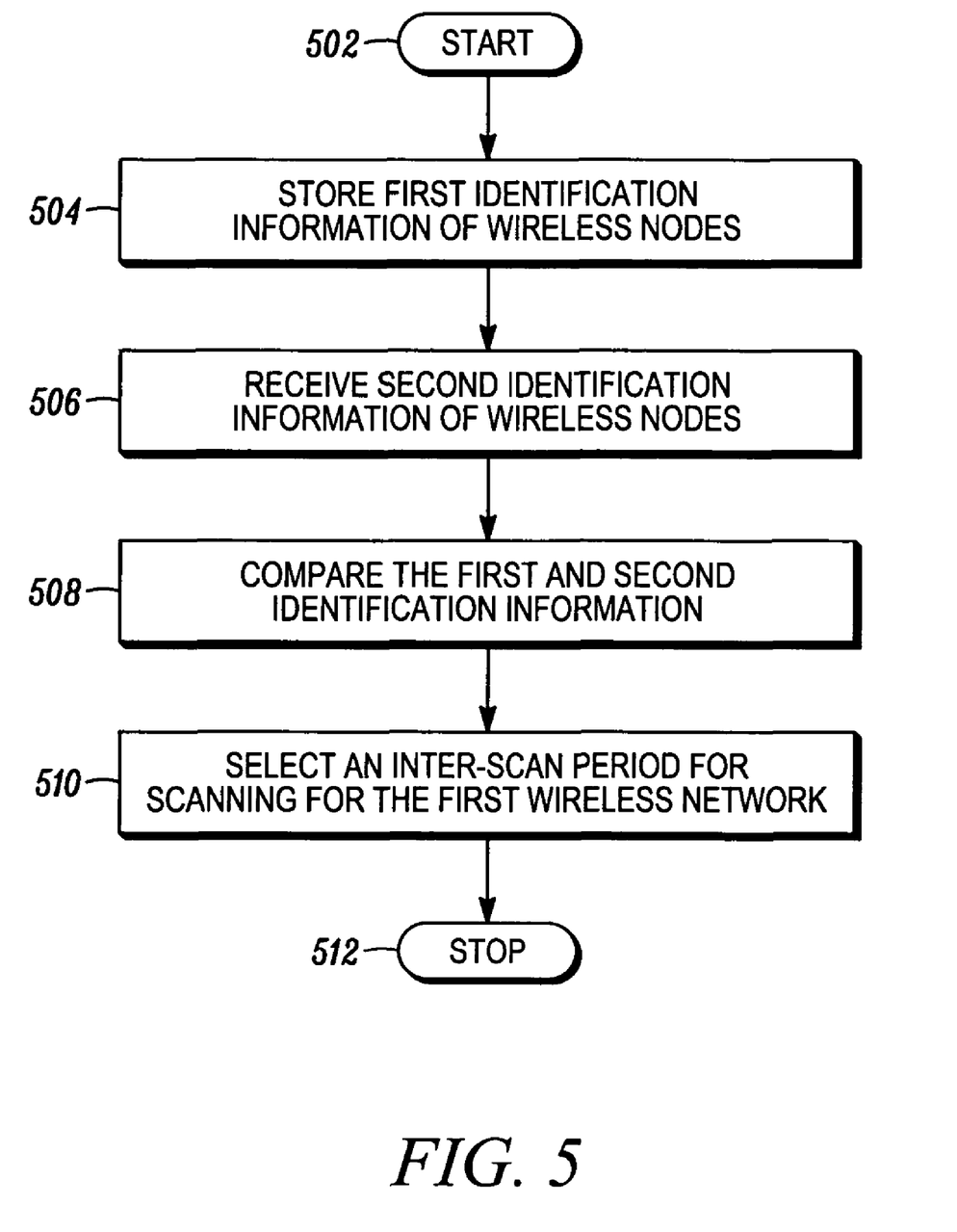
FIG. 5 is a flow diagram illustrating an exemplary method for adjusting the periodicity of scanning for wireless networks, in accordance with an embodiment of the present invention.
Figure 6:
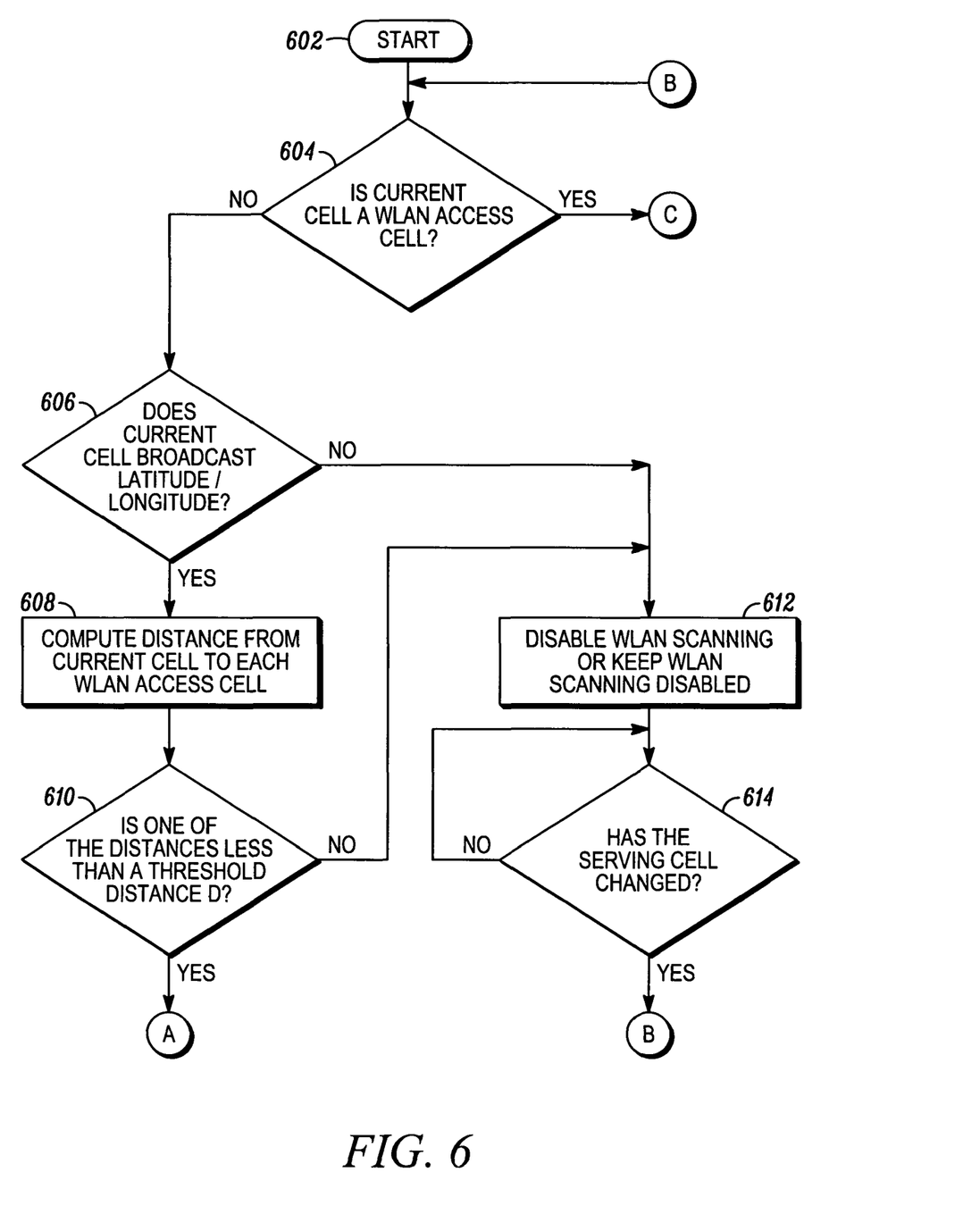
FIGS. 6, 7, 8, and 9 are flow diagrams illustrating an exemplary method for enabling scanning, and for the adjustment of the periodicity of scanning for wireless networks, in accordance with an embodiment of the present invention.
Figure 7:
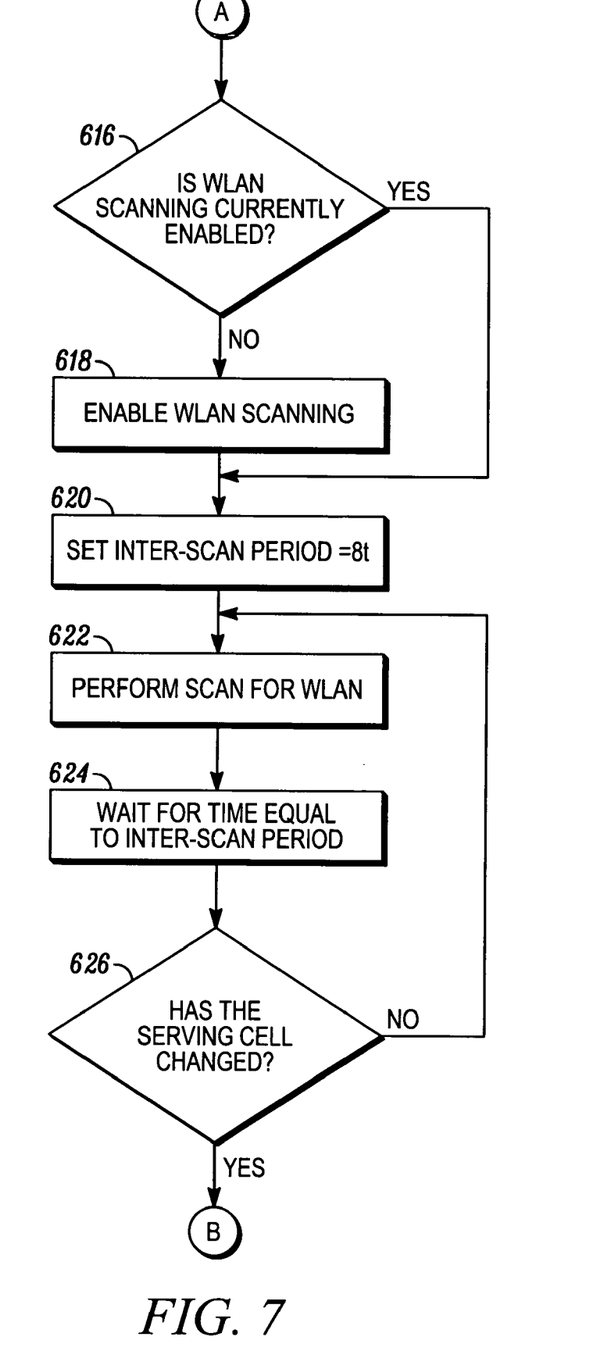
Figure 8:
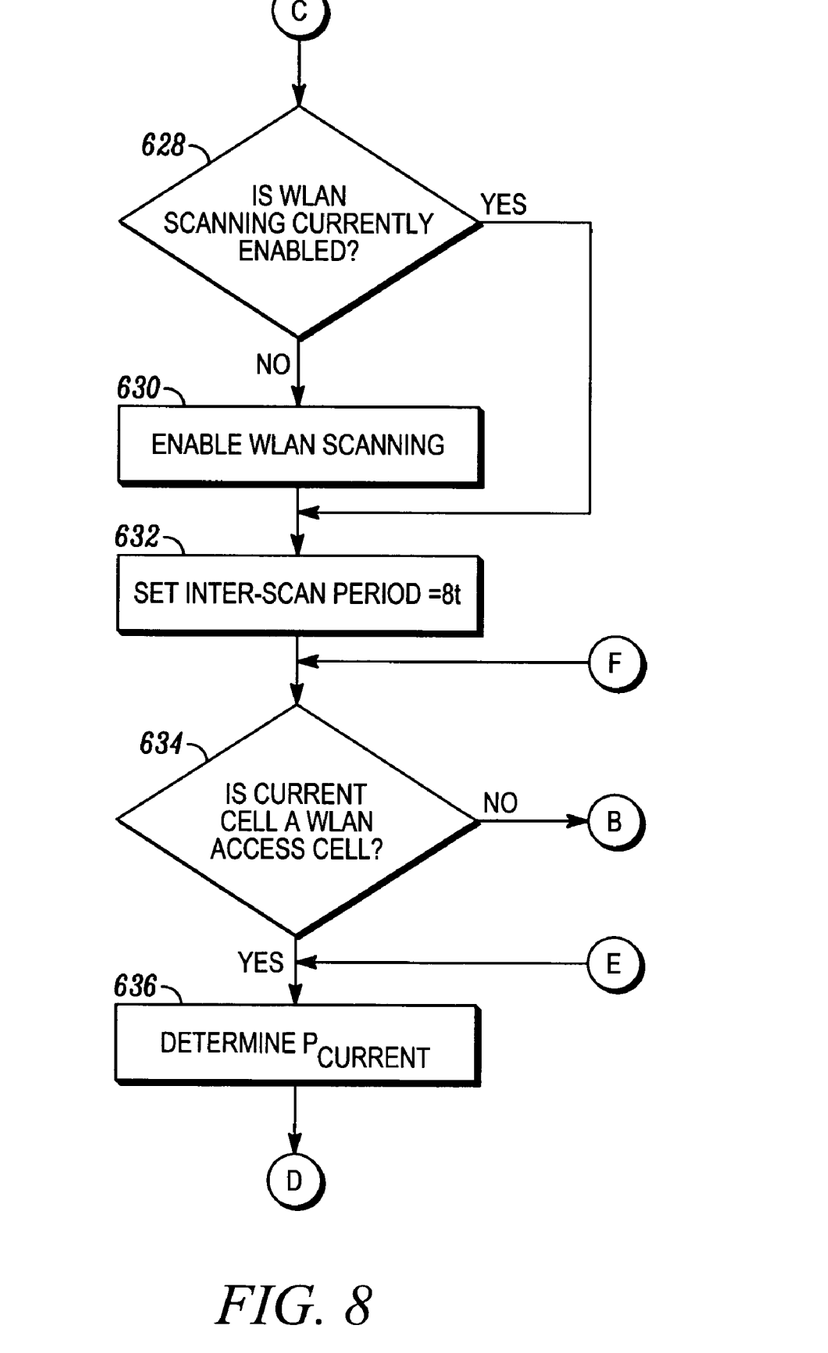
Figure 9:
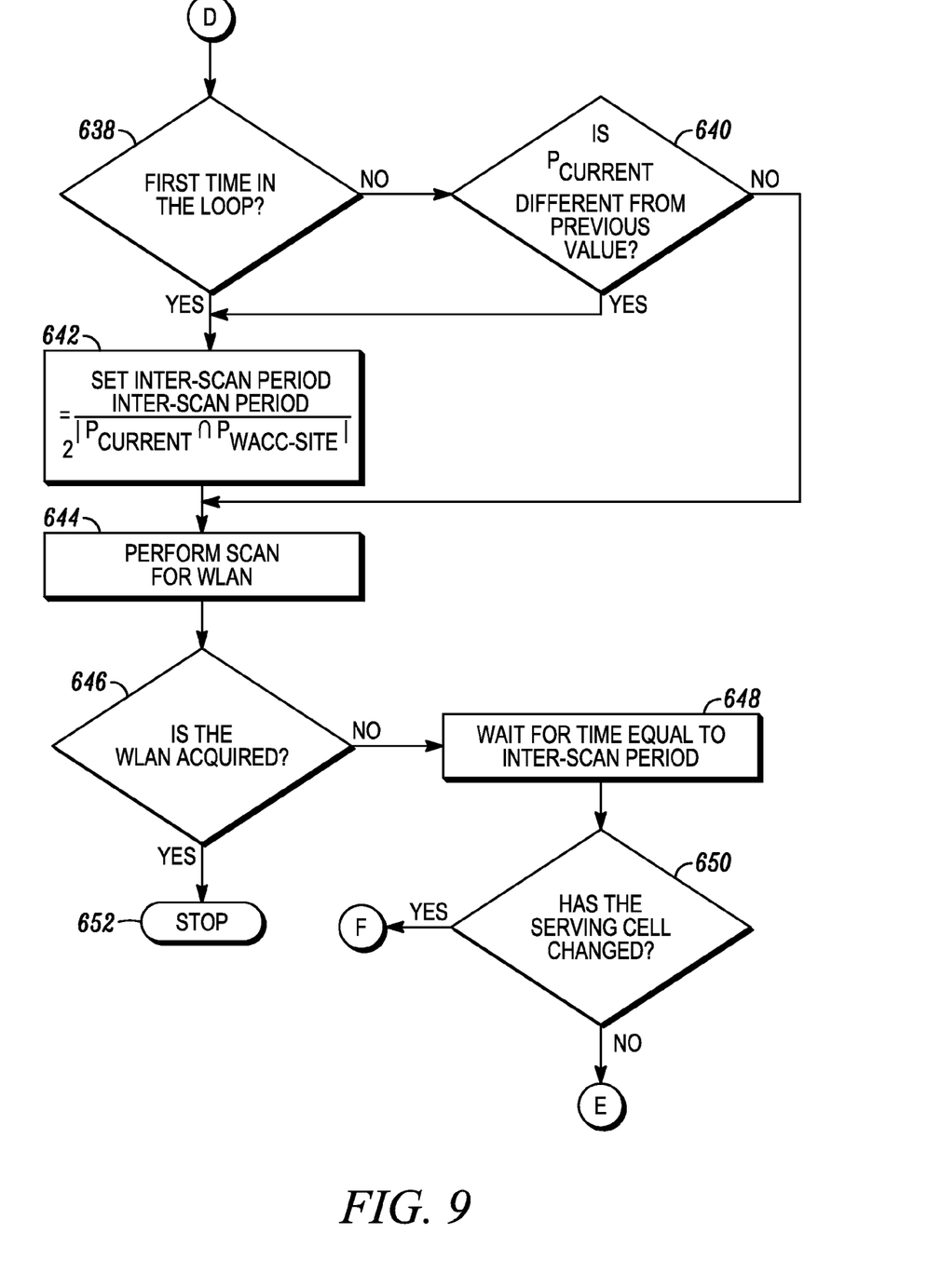

Referring to FIG. 5, a flow diagram illustrating an exemplary method of adjusting the periodicity of scanning for wireless networks is shown, in accordance with an embodiment of the present invention. After initiating the process at step 502, the mobile station 102 stores the first identification information of wireless nodes at step 504. These wireless nodes are detectable by the mobile station 102 at a first location. The first location is within proximity of an access point of the first wireless network. Further, the wireless nodes service the second wireless network. For one embodiment, the mobile station 102 stores wireless network identifiers of the wireless nodes that are detectable at the first location. At step 506, the mobile station 102 receives second identification information pertaining to wireless nodes, which are detectable by the mobile station 102 at a second location and service the second wireless network. For one embodiment, the first and the second identification information comprises a set of beacon signals. For another embodiment, the first and the second identification information comprises a set of pilot signals. At step 508, the first identification information is compared with the second identification information. In response to the comparison, an inter-scan period for scanning for the first wireless network is selected at step 510. Thereafter, the process terminates at step 512. For one embodiment, the first wireless network is a WLAN, the second wireless network is a wide area network (WAN), and the wireless nodes are access nodes of the second wireless network. For another embodiment, the first wireless network is a WLAN, the second wireless network is a cellular network, and the wireless nodes are cell sites of the second wireless network.

Referring to FIGS. 6, 7, 8, and 9, a flow diagram illustrating an exemplary method for enabling the operation of scanning and adjusting the periodicity of scanning for wireless networks is shown, in accordance with an embodiment of the present invention. After initiating the process at step 602, a check is performed at step 604, to ascertain if the current cell, in which the mobile station 102 is located, is a WLAN access cell. It will be apparent to a person skilled in the art that the present invention is not limited to WLAN, and is applicable to any other wireless communication medium. If the current cell is not a WLAN access cell, a check is performed at step 606 to ascertain if the wireless node in the current cell broadcasts latitude and longitude information. If it does, the distance of each WLAN access cell from the current cell is computed at step 608. At step 610, a check is performed to ascertain if at least one of the distances, computed at step 608, is less than the threshold distance D. If none of the distances computed at step 608 is less than the threshold distance D, or the current cell does not broadcast latitude and longitude at step 610, scanning for WLAN is disabled if it is currently enabled, or scanning for WLAN is kept disabled if it is currently disabled, at step 612. At step 614, a check is performed to ascertain if the cell serving the mobile station 102, known as the serving cell, has changed. If the serving cell has not changed, then the process of checking at step 614 is repeated till the serving cell changes. If any of the distances calculated at step 610 is less than the threshold distance D, a check is performed to ascertain if WLAN scanning is currently enabled, at step 616. If it is found that WLAN scanning is disabled at step 616, then it is enabled at step 618. After enabling the WLAN scanning, or if the WLAN scanning is currently enabled, the inter-scan period of the mobile station is set to 8t, at step 620. At step 622, scanning for the WLAN is performed. After waiting for a period that is equal to the inter-scan period at step 624, the mobile station 102 performs a check to ascertain if the serving cell has changed, at step 626. If, at step 626, it is found that the serving cell has not changed, steps 622 and 624 are repeated. However, if at step 626, it is found that the serving cell has changed, steps 604 to 624 are repeated. At step 628, a check is performed to ascertain if WLAN scanning is currently enabled. If WLAN scanning is not currently enabled at step 628, then it is enabled at step 630. After enabling the WLAN scanning, or if the WLAN scanning is currently enabled, the inter-scan period is set at 8t at step 632. At step 634, a check is performed to ascertain if the current cell is a WLAN access cell. If, at step 634, it is found that the current cell is a WLAN access cell, $P_{current}$ is determined at step 636. At step 638, a check is performed to ascertain if the inter-scan period of the mobile station 102 has been set before. If it has, a check is performed to ascertain if $P_{current}$ is different from the value set before, at step 640. If, at step 638, it is determined that the inter-scan period has not been set before, or, at step 640, if $P_{current}$ is different from the value set before, then, at step 642, the inter-scan period is set to a value equal $$\frac{\text{INITIAL INTER-SCAN PERIOD}}{2|P_{current} \cap P_{wacc-site}|},$$

where INITIAL INTER-SCAN PERIOD is equal to 8t. Thereafter, a scan for WLAN is performed at step 644. A scan for WLAN is also performed, if, at step 640, $P_{current}$ is not different from the value previously set. At step 646, a check is performed to ascertain if the WLAN has been acquired. If it has not been acquired at step 646, then the mobile station 102 waits for a period that is equal to the inter-scan period, at step 648. At step 650, a check is performed to ascertain if the serving cell has changed. If the serving cell has changed at step 650, steps 634 to 648 are repeated. If the serving cell has not changed at step 650, steps 636 to 648 are repeated. If, at step 646, the WLAN has been acquired, then the process terminates at step 652.

Figure 10:
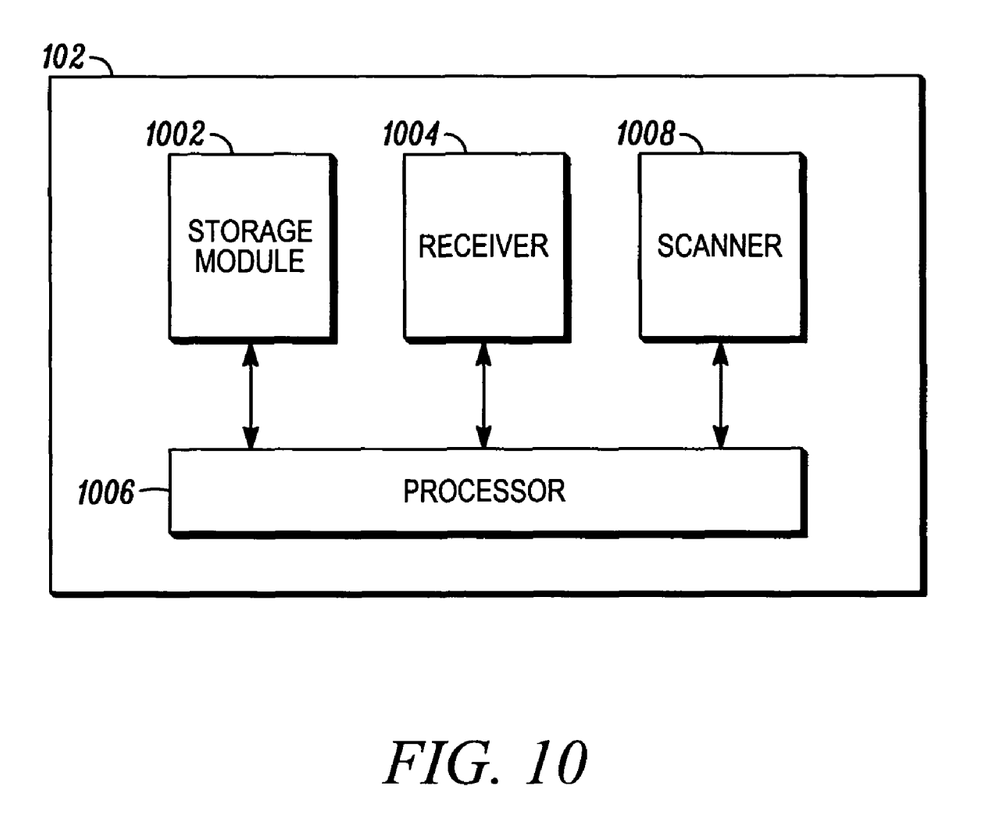
FIG. 10 is a block diagram illustrating exemplary components of a mobile station, in accordance with an embodiment of the present invention.

Referring to FIG. 10, a block diagram illustrating exemplary components of a mobile station is shown, in accordance with the present invention. The mobile station 102 includes a storage module 1002, a receiver 1004, a processor 1006, and a scanner 1008. The storage module 1002 is configured for storing a first identification information of wireless nodes that are detectable at a first location, the first location being within proximity of an access point of the first wireless network. The wireless nodes service the second wireless network. The receiver 1004 is configured to receive a second identification information pertaining to wireless nodes that are detectable at a second location and service the second wireless network. The processor 1006 is configured to at least determine the distance between the first and second wireless nodes, compare the first and second information, and select an inter-scan period for scanning for the first wireless network. The scanner 1008 is configured for scanning for the first wireless network.

For an embodiment, the storage module can also store the second information received by the receiver 1004.

For one embodiment, the present invention disables the scanning for wireless networks when the mobile station is located beyond a threshold distance D from known wireless network access sites. The present invention provides a method and system for scanning for wireless networks in a manner that enables minimization of the drain on the mobile station battery, while ensuring quick location of wireless networks when the mobile station enters the wireless network access site.

For one embodiment, the information pertaining to the second wireless network includes, but is not limited to, latitude information, longitude information, the wireless network identifier, wireless network signal strength information, transmit frequency information, transmit signal strength information, transmit power level information, synchronization information, convolutional encoder tail sequence information, serving frequency information, a Pseudo-random Noise (PN) offset, one or more pilot PN codes, a PN short code, and a PN sequence. The information pertaining to the second wireless network is dependent on the nature of the second wireless network. The above-mentioned information pertains to a CDMA cellular network, but the method and system are not limited to the CDMA cellular network and can be applied to any wireless network that allows information related to the location of the wireless network's base station being acquired, preferably without substantial expenditure of resources such as the mobile station battery.

It will be appreciated the processor described herein may be comprised of one or more conventional processors and unique stored program instructions that control the one or more processors to implement, in conjunction with certain non-processor circuits, some, most, or all of the functions of the processor described herein. The non-processor circuits may include, but are not limited to, a radio receiver, a radio transmitter, signal drivers, clock circuits, power source circuits, and user input devices. As such, these functions may be interpreted as steps of a method to adjust the inter-scan period of a MS. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein.

It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

What is claimed is:

1. A method of a mobile station (MS) for adjusting periodicity of scanning for a first wireless network, having at least one wireless access point, based on information of a second wireless network having a plurality of wireless nodes, the method comprising:
    storing first location information of a first wireless node, being in a service area of a wireless access point of the first wireless network, servicing the second wireless network;
    receiving second location information of a second wireless node servicing the second wireless network;
    determining a distance between the first and second wireless nodes; and
    scanning for the first wireless network in response to determining that the distance between the first and second wireless nodes is no greater than a predetermined threshold value.

2. The method of claim 1, wherein storing first location information comprises:
    storing latitude and longitude information of the first wireless node.

3. The method of claim 1, wherein receiving second location information comprises: receiving latitude and longitude information of the second wireless node.

4. The method of claim 1, further comprising: recording a serving frequency for the at least one wireless access point, serving the first wireless network, in the MS;
    and scanning for the serving frequency for the wireless access point serving the first wireless network.

5. A method of a mobile station (MS) for adjusting periodicity of scanning for a first wireless network, having at least one wireless access point based on information of a second wireless network having a plurality of wireless nodes, the method comprising:
    storing first identification information of wireless nodes, detectable at a first location within proximity of an access point of the first wireless network, servicing the second wireless network, wherein the first identification information comprises wireless network identifiers of the wireless nodes, detectable at the first location;
    receiving second identification information of wireless nodes, detectable at a second location, servicing the second wireless network, wherein the second identification information comprises wireless network identifiers of the wireless nodes, detectable at the second location;
    comparing the first identification information of wireless nodes and the second identification information of wireless nodes to determine a degree of overlap; and
    selecting an inter-scan period for scanning the first wireless network in response to comparing the first identification information of wireless nodes and the second identification information of wireless nodes, wherein the selecting comprises:
    calculating the inter-scan period for the MS where the inter-scan period decreases with an increase in the degree of overlap, the inter-scan period and the degree of overlap being related by an inverse relationship.

6. The method of claim 5, wherein determining the degree of overlap comprises: counting number of elements common to the first identification information and the second identification information.

7. The method of claim 5, wherein the inverse relationship comprises an inverse exponential relationship.

8. The method of claim 5, further comprising: recording a serving frequency for the at least one wireless access point, serving the first wireless network, in the MS;

and scanning for the serving frequency for the wireless access point serving the first wireless network.

9. A mobile station (MS) adjusting periodicity of scanning for a first wireless network, based on information of a second wireless network having a plurality of wireless nodes, the MS comprising:
- a storage module configured for storing a first identification information of wireless nodes, detectable at a first location within proximity of an access point of the first wireless network, servicing the second wireless network, wherein the first identification information comprises wireless network identifiers of the wireless nodes, detectable at the first location;
- a receiver configured for receiving a second identification information of wireless nodes, detectable at a second location, servicing the second wireless network, wherein the second identification information comprises wireless network identifiers of the wireless nodes, detectable at the second location;
- a processor configured for performing comparing the first and the second identification information of wireless nodes to determine a degree of overlap and selecting an inter-scan period for scanning the first wireless network that decreases with an increase in the degree of overlap being related to the degree of overlap by an inverse relationship in response to comparing the first identification information of wireless nodes and the second identification information of wireless nodes; and
- a scanner configured for scanning for the first wireless network.

10. The system of claim 9, wherein information of the second wireless network comprises one or more of a group comprising latitude information, longitude information, wireless network identifier, wireless network signal strength information, transmit frequency information, transmit signal strength information, transmit power level information, synchronization information, convolutional encoder tail sequence information, serving frequency information, a Pseudo-random Noise (PN) offset, one or more pilot PN codes, a PN short code, and a PN sequence.

11. The system of claim 9, wherein the storage module is further configured for recording a serving frequency for the at least one wireless access point, serving the first wireless network.

12. The system of claim 9, wherein the second information is stored in the storage module.

13. The system of claim 9 wherein each of the first and second identification information comprises one of a group consisting of a set of beacon signals and a set of pilot signals.

14. The system of claim 9, wherein the first wireless network is a wireless local area network, the second wireless network is a wide area network and the wireless nodes are access nodes of the second wireless network.

15. The system of claim 9, wherein the first wireless network is a wireless local area network, the second wireless network is a cellular network and the wireless nodes are cell sites of the second wireless network.

* * * * *